United States Patent
Greene et al.

[11] 4,012,713
[45] Mar. 15, 1977

[54] SYSTEM FOR PROVIDING AN INDICATION OF WIND SHEAR

[75] Inventors: Leonard M. Greene, Chappaqua; Ramon Bloch, Yonkers, both of N.Y.

[73] Assignee: Safe Flight Instrument Corporation, White Plains, N.Y.

[22] Filed: Nov. 5, 1975

[21] Appl. No.: 629,031

[52] U.S. Cl. .............................. 340/27 R; 73/178 R; 235/150.2; 244/191; 340/177 R

[51] Int. Cl.² .......................................... G01C 5/00

[58] Field of Search ............... 73/178 R; 235/150.2, 235/150.22; 244/182, 183, 186–188, 191; 318/583; 340/27, 177 R

[56] References Cited
UNITED STATES PATENTS

| | | | |
|---|---|---|---|
| 3,285,067 | 11/1966 | Greene | 244/191 X |
| 3,715,718 | 2/1973 | Astengo | 340/27 R |
| 3,868,074 | 2/1975 | Hill | 244/177 |
| 3,892,374 | 7/1975 | Lambregts | 244/182 |
| 3,908,934 | 9/1975 | Schloeman | 244/182 |

Primary Examiner—Stephen G. Kunin
Attorney, Agent, or Firm—Edward A. Sokolski

[57] ABSTRACT

The output of a transducer providing a signal in accordance with the instantaneous air speed of an aircraft is differentiated and fed to a summing device which subtracts therefrom a signal in accordance with the horizontal acceleration of the aircraft, this signal being derived from the output of an inertial instrument such as an accelerometer. The output of the summing device represents the magnitude of the wind shear condition (rate of change of wind velocity with changes in altitude). This signal is fed to appropriate indicator means which may comprise an appropriate display, a peak magnitude storage device, a warning device indicating a dangerous wind shear condition, or a telemetering device providing a wind shear reading to a ground station for use in advising other aircraft.

7 Claims, 4 Drawing Figures

SYSTEM FOR PROVIDING AN INDICATION OF WIND SHEAR

This invention relates to aircraft instruments, and more particularly to such an instrument which provides an output indicative of wind shear conditions.

Wind shear may be defined as the condition that exists where the velocity and/or direction of the wind is significantly changing with relatively small changes in altitude. Wind shear can impose a particularly hazardous situation when an aircraft is descending through an air mass while making an approach to an airport. Information as to the instantaneous wind shear condition could alert the pilot to incipient changes in the airspeed of the aircraft so as to enable him to take immediate corrective action. As noted, particularly in making landings, this type of information could be highly useful in avoiding accidents. Further, this information could be relayed to the control tower for use in warning other aircraft about to land. To the knowledge of applicant, no prior art system has been developed for providing instantaneous wind shear information. The system of the present invention is therefore believed to constitute a significant contribution to the art by improving aircraft safety, particularly during landing operations.

It is therefore the principal object of this invention to improve aircraft safety.

It is another object of this invention to provide means for generating a signal indicative of wind shear for use by an aircraft pilot particularly during landing operations.

It is still another object of this invention to provide means for generating a signal in accordance with wind shear for transmission to a ground station for utilization in guiding other aircraft.

Other objects of this invention will become apparent as the description proceeds in connection with the accompanying drawings, of which:

Briefly described, the invention is as follows: The electrical output of an aircraft instantaneous airspeed transducer is differentiated to provide an output representing the rate of change in airspeed. An accelerometer is mounted on the aircraft to sense acceleration along the fuselage reference line of the aircraft. The output of the accelerometer is fed to a summing device which also receives the output of a vertical gyro which is multiplied by a constant in accordance with the acceleration of gravity ($g\sin\theta$). The component of the acceleration signal representing $g\sin\theta$ is subtracted from the accelerometer output in the summing device to provide an output signal therefrom representing the horizontal acceleration (inertial) of the aircraft. This horizontal acceleration signal is subtracted from the differentiated airspeed signal in a summing device, the output of this second summing device representing wind shear. To more fully appreciate that this output signal is truly representative of the instantaneous wind shear, it should be noted that there is a lag in the acceleration (or deceleration) response of the aircraft to a change in wind velocity. Thus, even if the wind shear were appreciable enough to affect the inertial acceleration of the aircraft, such resulting acceleration would occur at a time subsequent to that at which the differentiated output of the instantaneous airspeed transducer partially representing the wind shear causing this acceleration is summed with the output of the accelerometer.

The signal in accordance with the magnitude of wind shear is fed to appropriate signal processor means which may comprise a direct display device, a threshold detector operating in conjunction with warning device which provides a warning signal when the wind shear exceeds a predetermined magnitude, a peak detector and storage device for providing a reading in accordance with the peak magnitude of wind shear over a predetermined period of time, or a telemetering transmitter for transmitting signals in accordance with wind shear to a ground station for display.

Figure 3:
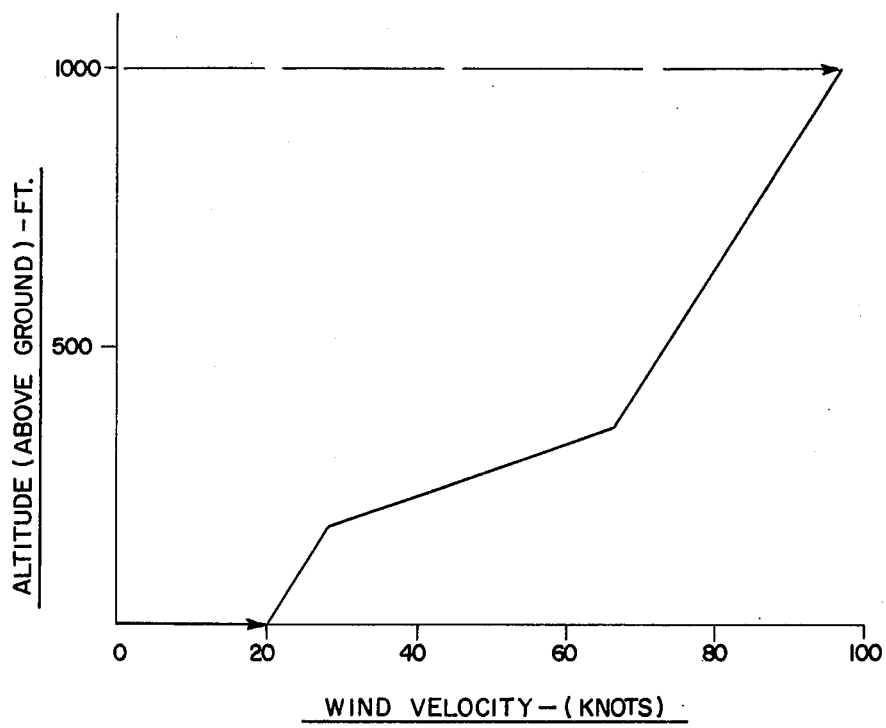
FIG. 3 is a chart illustrating a typical wind shear condition.

Referring now to FIG. 3, a graph is shown illustrating a typical wind shear condition. As can be seen, the wind velocity varies from 100 knots at 1,000 feet to 20 knots on the ground. For simplified illustration, it is assumed that there is no change in wind direction over this altitude range. It should be immediately apparent that in making a landing approach, a pilot encounters a considerable change in airspeed, the rate of such change with change of altitude being different over different altitude ranges.

Figure 1:
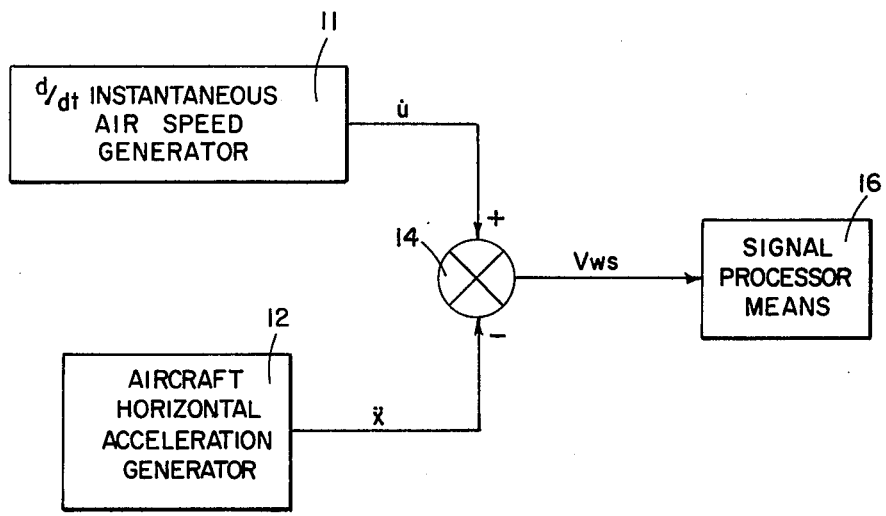
FIG. 1 is a schematic drawing indicating the basic features of the invention.

Referring now to FIG. 1, the basic operation of the system of the invention is schematically illustrated. Differentiated ($d/dt$) instantaneous airspeed generator 11 provides an output, $\dot{U}$, representing the rate of change in the instantaneous airspeed of the aircraft. As to be explained further on in the specification in connection with FIG. 2, such a signal may be conveniently generated by differentiating the electrical output of an instantaneous airspeed transducer (normally available in the aircraft). Aircraft horizontal acceleration generator 12 provides an output $\ddot{X}$, which is in accordance with the horizontal acceleration of the aircraft. This signal may be obtained by means of an accelerometer mounted along the fuselage line of the aircraft, the output of which is compensated to eliminate vertical components of acceleration due to gravity. Such an output may also be obtained directly from the accelerometer by mounting such accelerometer on an inertially stabilized platform so that it remains stabilized in a horizontal plane regardless of the pitch of the aircraft.

The horizontal acceleration signal, $\ddot{X}$, is subtracted from the rate of change of instantaneous airspeed signal, $\dot{U}$, in summing device 14. The output signal of summing device 14 represents wind shear, $V_{ws}$, and is in accordance with the rate of change of wind velocity. This wind shear signal, of course, can be either positive or negative. The wind shear signal is fed to signal processor means 16 which may include a display which continuously indicates the measured wind shear, a peak signal device which can be displayed to indicate the peak magnitude of wind shear over a predetermined time interval, a threshold detection device which operates in conjunction with a warning device to indicate when wind shear has exceeded a predetermined magnitude, and/or a telemetering system for transmitting signals in accordance with the measured wind shear to a ground station for display.

Figure 2:
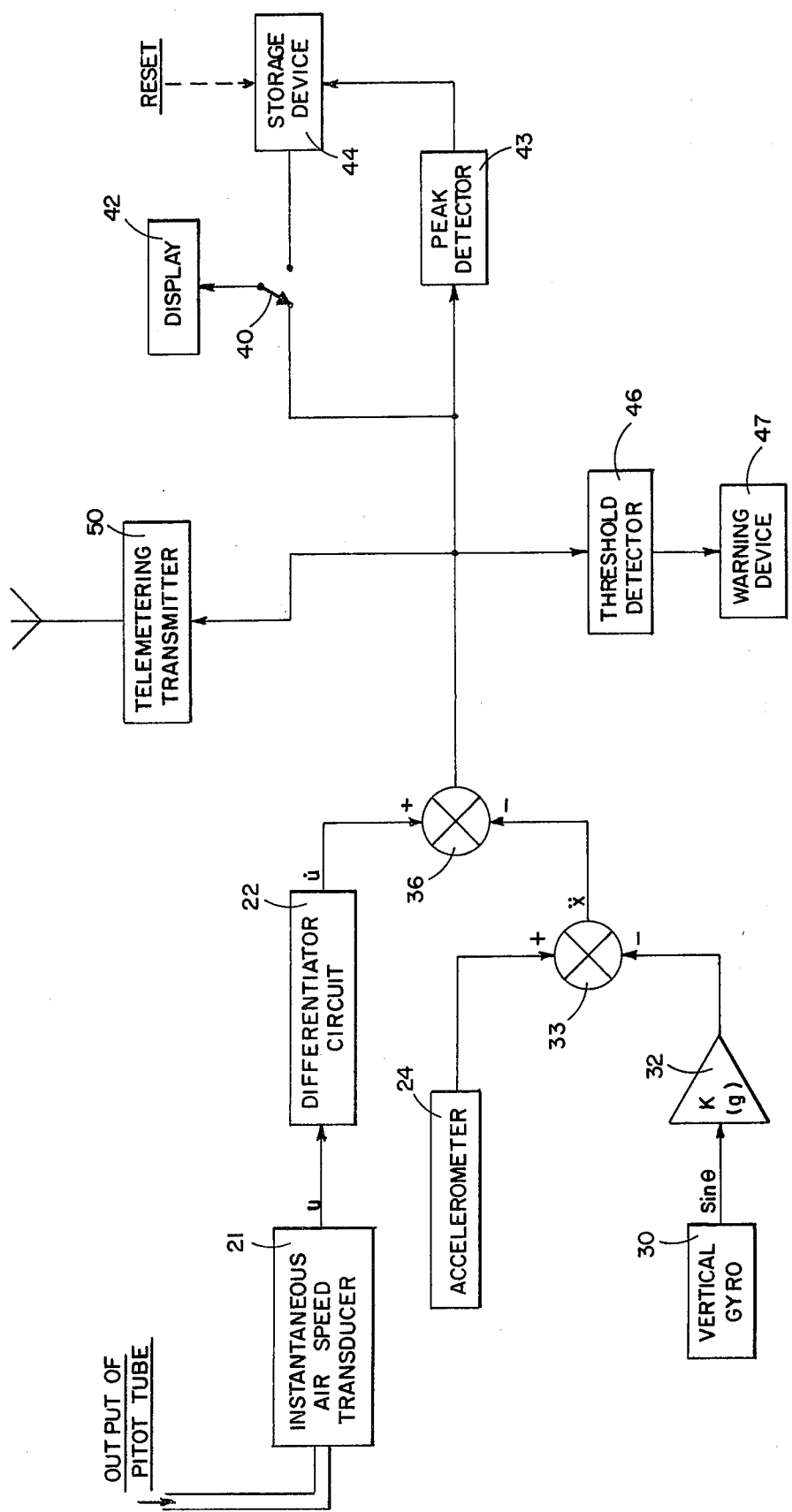
FIG. 2 is a functional block diagram illustrating a preferred embodiment of the invention.

Referring now to FIG. 2, a preferred embodiment of the invention is schematically illustrated. The instantaneous airspeed transducer 21 receives the output of the aircraft pitot tube and generates an electrical output signal, U, in accordance with the instantaneous airspeed of the aircraft. This electrical output is differentiated in differentiator circuit 22 to provide an output signal, U̇, in accordance with the rate of change of instantaneous airspeed. Accelerometer 24 is mounted along the longitudinal axis of the aircraft (fuselage reference line) and provides an output proportional to Ẍ + g sin θ where Ẍ is the horizontal acceleration of the aircraft, g is the acceleration of gravity (32.2ft/sec), and θ is the pitch angle of the aircraft. Vertical gyro 30 provides an electrical output signal in accordance with sin θ, this signal being multipled by a constant representing gravity, in amplifier 32. The output of amplifier 32 is subtracted from the output of accelerometer 24 in summing device 33 to provide a signal, Ẍ, which represents the horizontal acceleration of the aircraft independent of pitch. The output of summing device 33 is subtracted from the output of differentiator circuit 22 in summing device 36.

When there is no wind shear, the output of summing device 36 will be zero. With an increasing wind, U̇ will be more positive than Ẍ and will result in a positive wind shear output signal from summing device 36. With a decreasing wind, summing device 36 will have a negative wind shear output signal. The wind shear output of summing device 36 may be utilized in several ways. First, the signal may be fed directly through selector switch 40 to display 42. Display 42 may comprise a galvanometer calibrated to directly read wind shear in knots/minutes, or it may comprise a digital readout device providing such a reading. The output signal may also be fed to peak detector 43 and from this detector to storage device 44, which may comprise a capacitive storage circuit which stores the peak signal received thereby from detector 43. Switch 40 may be used to alternatively provide a reading on display device 42 of the peak signal stored in storage device 44 or the instantaneous magnitude of the wind shear appearing at the output of summing device 36. Storage device 44 may be reset to zero after a predetermined monitoring period has been completed.

Threshold detector 46 which operates in conjunction with warning device 47 is used to provide a warning to the pilot that a dangerous wind shear condition exists. Threshold detector 46 may comprise a trigger circuit biased so that it is actuated when the signal fed thereto from summing device 36 exceeds a predetermined value, this value representing a predetermined wind shear. When threshold detector 46 is actuated, it in turn actuates warning device 47 which may comprise a horn, buzzer, warning light or the like.

A telemetering transmitter 50 may also be provided to transmit wind shear information to a ground station for use by a ground controller in guiding the landings of other aircraft. In this manner, accurate information can be provided to warn incoming pilots of dangerous wind shear conditions.

Figure 4:
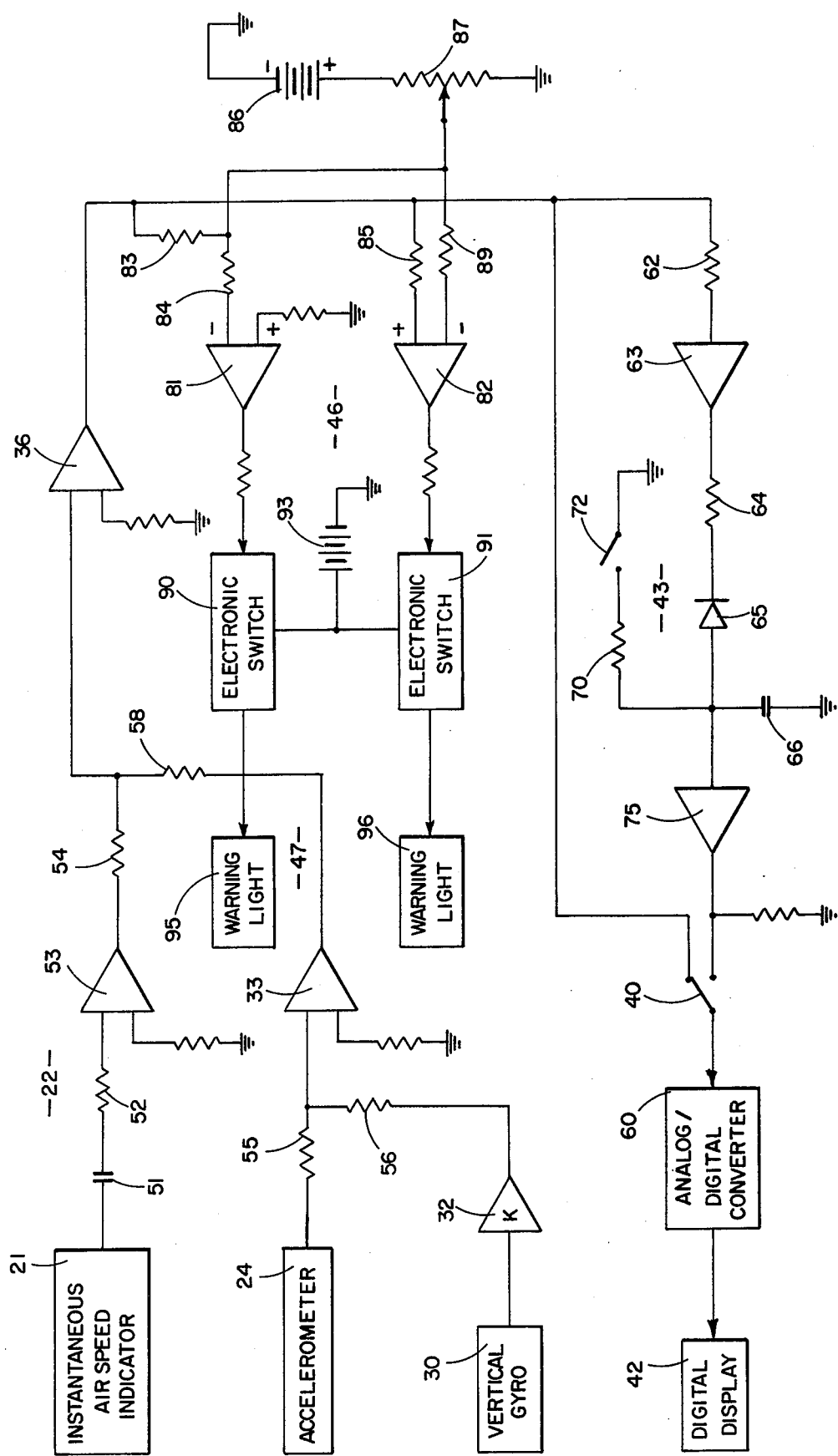
FIG. 4 is a schematic drawing of an implementation of the preferred embodiment.

Referring now to FIG. 4, an implementation of the preferred embodiment is schematically illustrated. The output of instantaneous airspeed indicator 21, which may be the airspeed indicator normally used on the aircraft, is differentiated by the differentiating circuit 22 which includes capacitor 51, resistor 52 and amplifier 53. The output of amplifier 53, which represents the rate of change in the instantaneous airspeed of the aircraft, is fed to summing amplifier 36 through resistor 54. Accelerometer 24, as already noted, is mounted on the aircraft to sense accelerations along the fuselage line. Accelerometer 24 may be a commercially available accelerometer such as Model No. 971-4118-003, manufactured by Sunstrand Data Control. The output of the accelerometer, which is a voltage in accordance with the sensed acceleration, is fed to summing amplifier 33 through resistor 55.

Vertical gyro 30, which may be the vertical gyro normally available on an aircraft to indicate aircraft pitch angle, provides an electrical output signal which is amplified by a predetermined constant (K) which is in accordance with gravity. The output of amplifier 32 is fed to summing amplifier 33 through resistor 56. The output of amplifier 32 is fed to summing amplifier 33 in a polarity such that it is subtracted from the output of accelerometer 24, thus providing an input to amplifier 33 which is in accordance with the horizontal inertial acceleration of the aircraft. The output of amplifier 33 is fed through summing resistor 58 to amplifier 36. The output of amplifier 33 is fed to amplifier 36 in a polarity such that it is subtracted from the output of amplifier 53. The output of amplifier 36 thus represents wind shear (the difference between the rate of change of instantaneous airspeed and aircraft horizontal inertial acceleration). The output of amplifier 36 is fed through selector switch 40 to analog/digital converter 60 where it is converted to digital form for display on digital display 42.

The output of amplifier 36 is also fed through resistor 62 to amplifier 63 and from this amplifier through resistor 64 and diode 65 to capacitor 66 which stores the peak value of the signal. Capacitor 66 may be discharged through resistor 70 by means of reset switch 72, thus initiating a new peak reading cycle. The peak signal is fed to amplifier 75, the output of which may be selectively fed to analog/digital converter 60 by means of selector switch 40.

The output of amplifier 36 is also fed to amplifiers 81 and 82, through resistors 83 and 84, and 85 respectively. A DC reference signal is provided by means of DC power source 86 and potentiometer 87, this reference signal being set by means of the potentiometer to represent a pre-desired wind shear warning level. The reference signal is fed from potentiometer 87 through resistor 89 to the negative input of amplifier 82, such that this amplifier will have an output signal when the wind shear input to the amplifier increases above the level of the reference. On the other hand, the reference signal from potentiometer 87 and the wind shear signal are both fed to the negative input of amplifier 81 where they are summed. The amplifier is biased at its positive input so that when the wind shear signal decreases below a predetermined magnitude, an output will be produced from amplifier 81. The outputs of amplifiers 81 and 82 are fed to electronic switches 90 and 91 respectively, and operate to actuate the switches in response to the predetermined "out-of-limits" wind shear signals. When electronic switch 90 is actuated, it connects power from power source 93 to warning light 95. Similarly, electronic switch 91 operates to provide power from power source 93 to warning light 96. Warning light 95 may be a red light indicating a decreasing airspeed condition, while warning light 96 may be a white light indicating an increasing airspeed condition.

While the invention has been described and illustrated in detail, it is to be clearly understood that this is by way of illustration and example only and is not to be taken by way of limitation, the spirit and scope of this invention being limited only by the terms of the following claims.

I claim:

1. A system for generating a windshear signal representing the windshear condition encountered by an aircraft comprising:

means for generating a signal representing the rate of change of the instantaneous airspeed of the aircraft, means for generating a signal representing the horizontal inertial acceleration of the aircraft, means for subtracting the horizontal inertial acceleration signal from the rate of change of instantaneous airspeed signal to provide a windshear signal representing windshear, and means for processing said windshear signal to provide an indication representing the magnitude thereof.

2. The device of claim 1 wherein said processing means comprises a display for directly displaying the magnitude of the wind shear signal.

3. The system of claim 1 wherein said processing means comprising a warning device for generating a warning signal and detector means responsive to the wind shear signal for actuating said warning device when the wind shear signal exceeds a predetermined value.

4. The device of claim 1 wherein said processing means comprises peak detector means for providing an output in accordance with the peak value of said wind shear signal, storage means for storing the peak output of said detector means and display means for providing a display in accordance with the peak signal stored in said storage means.

5. The system of claim 1 wherein said processing means comprises a telemetering transmitter for transmitting said signal in accordance with wind shear to a ground station.

6. The system of claim 1 wherein said means for generating a signal in accordance with the rate of change of airspeed comprises an instantaneous airspeed transducer for providing an output signal in accordance with instantaneous airspeed and differentiator means for differentiating the output of said transducer.

7. The system of claim 1 wherein said means for generating a signal in accordance with aircraft horizontal acceleration comprises an accelerometer mounted along the fuselage reference line of said aircraft for sensing accelerations along said reference line, means for generating a signal in accordance with the pitch of said aircraft and means for subtracting said signal in accordance with aircraft pitch from the output of said accelerometer.

* * * * *